Sept. 29, 1931.     A. CERNUDA     1,825,578
AIRPLANE
Filed Jan. 2, 1930     2 Sheets-Sheet 1
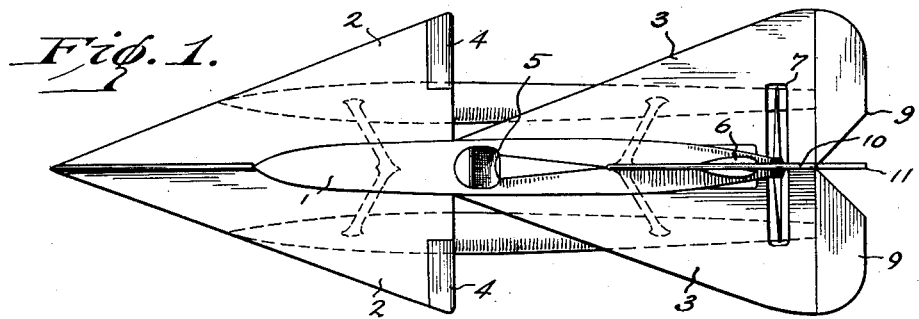
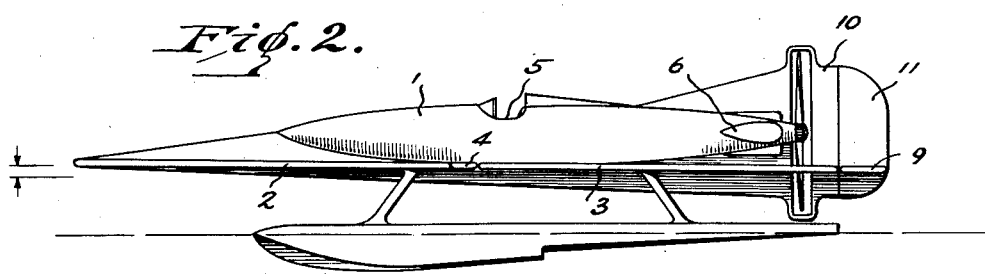
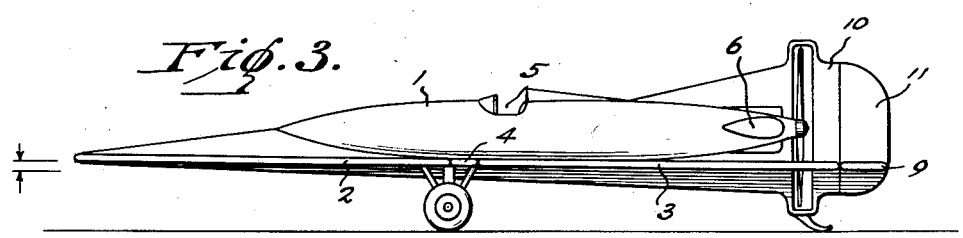
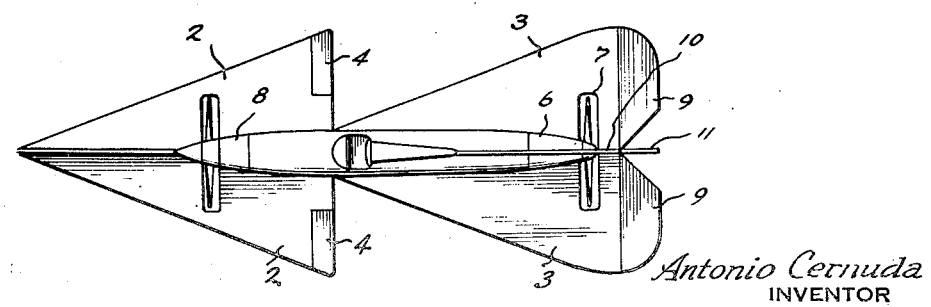
Antonio Cernuda
INVENTOR
BY Victor J. Evans
ATTORNEY Sept. 29, 1931.  A. CERNUDA  1,825,578
AIRPLANE
Filed Jan. 2, 1930  2 Sheets-Sheet 2
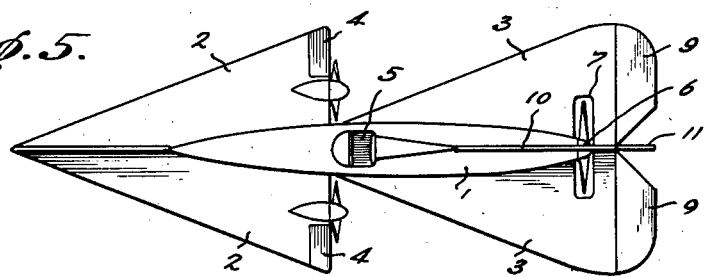
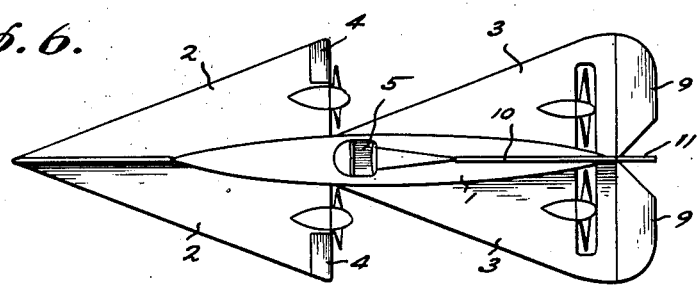
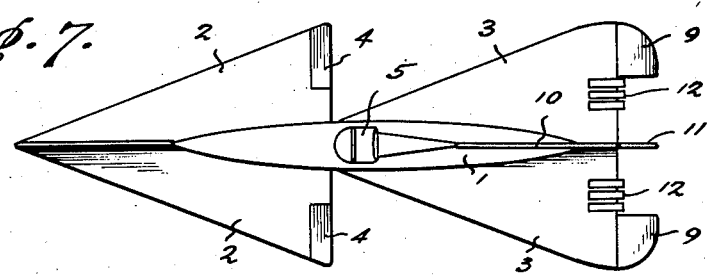
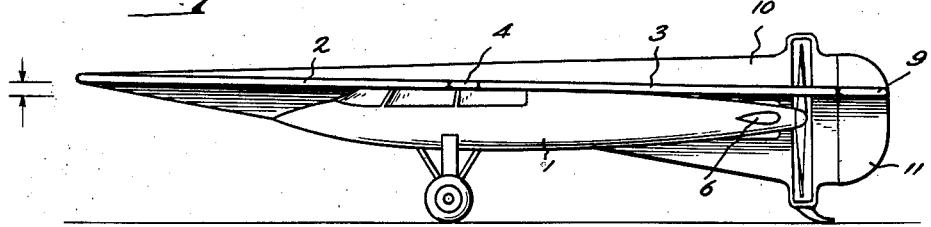
Antonio Cernuda
INVENTOR
BY
Victor J. Evans
ATTORNEY Patented Sept. 29, 1931

1,825,578

UNITED STATES PATENT OFFICE

ANTONIO CERNUDA, OF HABANA, CUBA

AIRPLANE

Application filed January 2, 1930. Serial No. 418,128.

This invention relates to aircraft in general and particularly to heavier-than-air flying machines such as airplanes.

From the day of birth of the airplane there has been a continual seeking after means for increasing the speed of such aircraft and particularly for means to reduce the air resistance acting upon the wings and fuselage of the airplane in order to reduce the power of the engine required to drive the airplane through the air.

The resistance of the air to bodies in motion varies as a power of the speed. At low speeds, say up to fifty miles per hour, the resistance to motion of a body through the air is a negligible factor compared to speeds of say, 150 miles per hour, but, as the resistance varies as the power of the speed, the power required to drive a body through the air also increases as a higher power of the speed. The result is that at very high speeds, say from 150 miles per hour on, the air resistance becomes such a large factor that an excessively high power engine or engines must be provided in order to produce such speeds. The great weight of the engine or engines soon reaches a point where the wing surfaces are no longer able to sustain the airplane in the air. It is clear, therefore, that the only solution of the problem of speed in aircraft is to reduce the air resistance to a point where the engine power is not excessively large and the weight of the engines is within the lifting power of the wing surfaces.

Hitherto the wing surface or surfaces sustaining flight in airplanes have consisted primarily in lateral wings of conventional design projecting from the side of the fuselage assisted to some extent by stabilizers carried by the tail portion of the fuselage. These wing surfaces in high speed airplanes have been cut down to a very small spread laterally compared to slower speed airplanes so that the air resistance is considerably reduced, permitting tremendous speeds to be maintained without the great increase in engine power and weight which would otherwise be necessary.

It is the broad object of this invention to provide a novel construction embodying flight sustaining surfaces which materially reduce the air resistance without loss of lifting power and without requiring excessively high powered engines with their correspondingly great weight.

Other objects and advantages of the invention will be hereinafter specifically pointed out, or will become apparent, as the specification proceeds.

With the above indicated objects in view, the invention resides in certain novel constructions and combinations and arrangements of parts, clearly described in the following specification and fully illustrated in the accompanying drawings, which latter show embodiments of the invention as at present preferred.

In said drawings:

Figure 1 is a top plan view illustrating an embodiment of the invention in a seaplane.

Figure 2 is a side elevation of the embodiment illustrated in Figure 1.

Figure 3 is a side elevation showing an embodiment of the invention in a land airplane.

Figure 4 represents a modification in which two engines have been provided.

Figure 5 illustrates a modification in which three engines have been provided.

Figure 6 illustrates another modification in which four engines have been provided.

Figure 7 illustrates a modification in which a plurality of rockets have been provided for the purpose of securing greater speed.

Figure 8 illustrates a modification in which the wing surfaces have been placed above the fuselage.

In order to reduce the resistance offered by the air to flight there has been provided a plurality of flight sustaining surfaces arranged in front of each other upon the fuselage of the airplane, the general contour in plan view, as illustrated in the several figures, being like the head of a dart. In the following description of the preferred embodiment and the various modifications the relation and construction of the wing surfaces and fuselage is substantially the same, therefore, similar reference characters will apply to all, and, where differences exist the differences will be clearly pointed out.

The numeral 1 in the various figures represents the body or fuselage of an airplane. The fuselage is preferably formed with stream lines so as to offer as little resistance as possible to passage through the air. Attached to the fuselage 1 are sustaining members 2 and 3 which have the general configuration shown in the plan views of the drawings, that, is the shape of the head of a dart in general outline. The outer or leading edges of the members 2 converge to a point forward of the fuselage while the leading edges of the members 3 converge to the side of the fuselage. The under and upper surfaces of the members 2 and 3 meet the sides of the fuselage in smooth stream-line surfaces or lines so as to reduce to a minimum the resistance which such surfaces or lines frequently offer in the ordinary type of airplane of relatively low speed. The members 2 may be substantially cambered slightly as is usually the case and are provided with a slight "lift" at the forward edges sufficiently great to give a small angle of attack of the members 2. The members 3 are likewise constructed and are so disposed with relation to the members 2 that the leading edges are substantially behind and in line with the trailing edges of the members 2.

The trailing portion of the outer ends of the members 2 are provided with suitable ailerons 4 which may be controlled in the usual manner by means of a control lever or wheel in the cockpit 5 in which the pilot sits. The main motor 6 is mounted on the tail of the fuselage and the members 3 are cut away or formed with apertures as at 7 to permit the propeller to revolve freely without colliding with the members. The embodiment illustrated in Figure 1 shows a single motor, however, it is contemplated that more than one motor may be used. When two motors are used, the second motor may be mounted forwardly of the cockpit 5 as at 8, Figure 4, the members 2 being cut away to permit the propeller of the motor 8 to revolve. If desired three motors may be used, two being mounted on the trailing portion of the members 2, as shown in Figure 5. When four motors are required they may be disposed of, as indicated in Figure 6, in which a motor is mounted on each of the members 2 and 3.

The trailing edges of the members 3 are equipped with horizontal rudders 9 of the customary construction while a vertical stabilizer 10 is carried upon the tail of the fuselage. The vertical rudder 11 is carried by the trailing edge of the stabilizer 10 in the usual manner. The stabilizer 10 is cut away in a manner similar to the members 3 to permit the propeller to revolve.

In Figure 8 there is illustrated a modification of the construction shown in the previous figures which illustrate airplanes in which the fuselage is above the surfaces sustaining flight, that is, where the surfaces sustaining flight are attached to the underside of the fuselage. Figure 8 shows the fuselage occupying a position beneath the members 2 and 3 and has been modified to the following extent:

The vertical stabilizer 10 is extended forwardly to the point of junction of the converging edges of the members 2 and forms a central longitudinal rib which joins the fuselage in a smooth surface of joinder, adapted to reduce to a minimum the possibility of eddying of air when the airplane is in flight. In the other modifications and the preferred embodiment this central rib is on the underside of the fuselage. The modification shown in Figure 8 is in most respects generally similar in construction to the embodiments shown in Figures 1 to 6, except for the number of motors and is shown equipped with landing wheels and a tail skid. It will be obvious of course, that suitable pontoons might be substituted for the landing wheels. Since the fuselage is below the members 2 and 3 the cockpit has been completely enclosed so as to form a cabin.

The embodiment illustrated in Figures 1 and 2 shows pontoons for the purpose of landing on water while the embodiment illustrated in Figure 3 shows landing wheels and a tail skid. As the landing gear forms no part of the present invention it has been shown solely for sake of completeness and finish in order to convey the proper impression to the mind of how the invention is put in practice.

Figure 7 represents a slight modification in that rockets 12 are provided, carried by the trailing edges of the horizontal stabilizer. The horizontal rudders 9 shown in Figure 7 are shorter laterally in order to provide room for the rockets. The rockets are adapted to be set off simultaneously by the pilot for the purpose of increasing the speed, and are preferably arranged in two tiers in the rear or trailing edge of the horizontal stabilizer in order to avoid damage to the vertical rudder which might otherwise be swung on its pivot into the path of the stream from the rockets.

While in general the description of the invention has been centered largely upon Figures 1 and 2 of the drawings, and in that sense only the embodiment shown in those figures may be said to be the preferred or ideal embodiment of the invention it is not desired to be limited to the precise construction shown, but considerable latitude is possible in adapting the invention to airplanes intended to travel at different speeds as clearly illustrated in the other figures. The various figures, so far as the general construction is concerned is substantially the same and each figure is entitled to the same weight as the others in determining the scope of the invention.

It will be quite apparent from a study of the drawings, that the peculiar design of the members 2 and 3 and their relation to each other and to the fuselage 1 is such that a minimum of air resistance will be offered to aircraft embodying this invention while such craft are in flight making it possible to attain great speeds without the necessity of providing an excessively large propulsive means. The rib extending lengthwise of the fuselage serves a very important function of keeping an airplane embodying it in a straight course and may be likened to the keel of a ship in that respect. The general contour of the fuselage, members 2 and 3, the central rib and the horizontal and vertical stabilizers is such that the least possible resistance will be offered to flight at high speeds through the air.

The hereinbefore described construction, admits of considerable modification without departing from the invention; therefore, it is desired not to be limited to the precise arrangements shown and described, which are as aforesaid, by way of illustration merely. In other words, the scope of protection contemplated is to be taken solely from the appended claims, interpreted as broadly as is consistent with the prior art.

What is claimed as new, is:

1. An airplane structure including a combination of airfoil elements together forming, with another part of the airplane, a general dart-like air-attacking structure of high lift efficiency, said general dart-like structure including a pair of equally laterally extending dart-shaped sustaining surfaces in tandem relationship.

2. An airplane structure including a combination of airfoil elements together forming, with another part of the airplane, a general dart-like air-attacking structure, possessing a high lift efficiency at high speeds, said general dart-like structure including a pair of dart-shaped lifting surfaces in tandem relationship arranged in substantially the same plane and extending equally laterally.

3. An airplane structure including a combination of airfoil elements together forming, with another part of the airplane, a general dart-like air-attacking structure possessing a high lift efficiency at high speeds, said general dart-like structure including a pair of dart-shaped lifting surfaces in tandem relationship arranged in substantially the same plane, and at substantially the same angle of attack and extending to equal distances laterally.

4. An airplane structure including a combination of airfoil elements together forming, with another part of the airplane, a general dart-like air-attacking structure, said general dart-like structure including a pair of dart-shaped sustaining surfaces in tandem relationship, said surfaces being arranged to extend equally laterally and disposed at an angle of attack which closely approaches the horizontal while in flight.

5. An airplane structure including a combination of airfoil elements together forming, with another part of the airplane, a general dart-like structure, said general dart-like structure including a plurality of dart-shaped lifting surfaces of high efficiency in tandem relation, arranged at an angle of attack which closely approaches the horizontal while in flight, and a plurality of propulsive means mounted in tandem relation within said dart-like lifting surfaces, the latter being provided with apertures for part of said means.

6. An airplane structure including a combination of airfoil elements together forming, with another part of the airplane, a general dart-like air-attacking structure, said airfoils being all arranged to extend equally laterally and being disposed in substantially the same plane and at an angle of attack which closely approaches the horizontal while in flight, and a plurality of propulsive media disposed in tandem relation within said airfoils.

7. An airplane structure including a combination of airfoil elements together forming, with another part of the airplane, a general dart-like air-attacking structure having a high lift efficiency and low air resistance at high speeds, said general dart-like structure including a pair of dart-heads in tandem relations, said heads extending equally laterally in substantially the same plane, and arranged at an angle of attack which closely approaches the horizontal while in flight.

8. An airplane structure including a combination of airfoil elements together forming, with another part of the airplane, a general dart-like air-attacking structure, said general dart-like structure including a plurality of dart-shaped sustaining surfaces in tandem relationship, said airfoils being all arranged at an angle of attack which closely approaches the horizontal while in flight and propulsive means mounted within said airfoil elements, there being apertures in the latter for part of said means.

9. An airplane structure including a combination of airfoil elements together forming, with another part of the airplane, a general dart-like air attacking structure having a high lift efficiency and low air resistance at high speeds, said general dart-like structure including a plurality of dart-heads in tandem relations all arranged in substantially the same plane, and at an angle of attack which closely approaches the horizontal while in flight and propulsive means mounted within said airfoil elements, there being apertures in the latter for part of said means.

In testimony whereof I hereby affix my signature.

ANTONIO CERNUDA.